United States Patent [19]

Hinn

[11] 4,309,719

[45] Jan. 5, 1982

[54] DUAL STANDARD PAL/SECAM RECEIVER CIRCUITRY

[75] Inventor: Werner Hinn, Zollikerberg, Switzerland

[73] Assignee: RCA Corporation, New York, N.Y.

[21] Appl. No.: 202,503

[22] Filed: Oct. 31, 1980

Related U.S. Application Data

[63] Continuation of Ser. No. 105,581, Dec. 20, 1979, abandoned.

[30] Foreign Application Priority Data

Jan. 9, 1979 [GB] United Kingdom ............... 801/79

[51] Int. Cl.³ .................................... H04N 9/535
[52] U.S. Cl. ...................... 358/21 R; 358/14; 358/16; 358/39; 358/40
[58] Field of Search ............... 358/11, 14, 16, 21, 358/24, 40, 12, 35, 39

[56] References Cited

U.S. PATENT DOCUMENTS 2,892,024 6/1959 Davis .................................. 178/5.4
2,910,528 10/1959 Petersen ............................ 178/5.4

FOREIGN PATENT DOCUMENTS 7442824 7/1976 France .
1358551 7/1974 United Kingdom .

OTHER PUBLICATIONS

Peter, Radio Mentor Electronic, vol. 38 #9, pp. 432-435, Sep. 1972.

Funkschau, vol. 46, No. 22, pp. 845-847, Oct. 1974.

Primary Examiner—Robert L. Richardson
Attorney, Agent, or Firm—Eugene M. Whitacre; Paul J. Rasmussen; William H. Meagher

[57] ABSTRACT

In a dual-standard PAL/SECAM color TV receiver, an identification system provides a mode-switching output, permitting automatic switching of the receiver between a PAL-reception mode of operation and a SECAM-reception operating mode, in dependence upon the PAL or SECAM nature of the transmission received. In the SECAM-reception mode, a PAL decoder receives the chrominance component output of a SECAM-PAL transcoder; in the PAL-reception mode, the PAL decoder receives chrominance signals which bypass the transcoder. Luminance signal channel of the dual-standard receiver includes a switchable luminance signal delay line in cascade with a chrominance component trap circuit. Switchable delay line is controlled by mode-switching output of identification system such that delay line is interposed in luminance signal path only during SECAM-reception mode operation. Delay magnitude provided by delay line substantially matches difference in delays suffered by chrominance information during operation in the respective modes. Trap circuit, providing luminance delay substantially compensating delay suffered by chrominance information during operation in PAL-reception mode, includes resonant circuits tuned respectively to upper and lower SECAM subcarrier resting frequencies.

4 Claims, 1 Drawing Figure

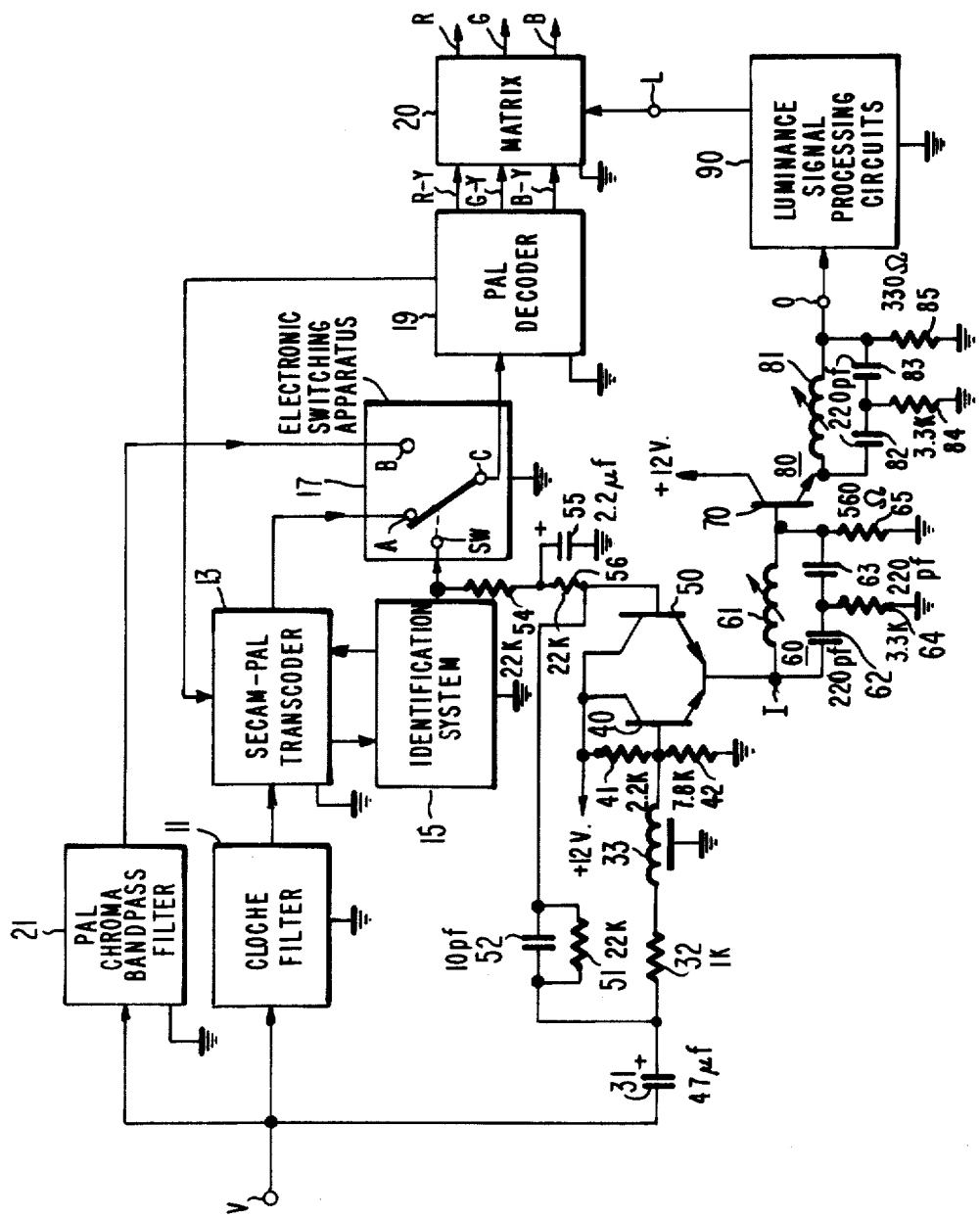

DUAL STANDARD PAL/SECAM RECEIVER CIRCUITRY

This is a continuation of application Ser. No. 105,581, filed Dec. 20, 1979, and now abandoned.

The present invention relates generally to luminance channel circuitry for a color television receiver, and particularly to novel circuits providing controllable delay for a received luminance component, which may advantageously be employed, for example, in the luminance channel of a dual standard PAL/SECAM receiver.

In the copending U.S. patent application Ser. No. 001,166, now U.S. Pat. No. 4,233,622, a dual-standard PAL/SECAM color TV receiver arrangement is disclosed wherein standard PAL decoder apparatus is utilized (a) to decode, in conventional manner, a PAL-encoded signal, when such a transmission is received, and (b) to decode a quasi-PAL signal, developed by a SECAM-PAL transcoder operating in the general manner described in U.K. Pat. No. 1,358,551, when a SECAM transmission is received. By utilizing a suitable identification system, such as described, for example, in the copending U.S. patent application Ser. No. 020,942, now U.S. Pat. No. 4,240,102, the receiver may be automatically switched, in dependence on the SECAM or PAL nature of the transmission received, between a SECAM-reception mode of operation, in which the PAL decoder apparatus receives as its input the output of the SECAM-PAL transcoder, and a PAL-reception mode of operation, in which the PAL decoder apparatus receives as its input signals which bypass the transcoder and pass instead through an appropriate PAL chroma bandpass filter.

When a receiver of the above-described type is operating in the PAL-reception mode, the PAL signal's chrominance information is subject to a given amount of delay during its processing (e.g., by such elements as the aforementioned PAL chroma bandpass filter), prior to its delivery in the form of color-difference signals to matrix circuitry of the PAL decoder for combination with luminance signals. When such a receiver is operating in the SECAM-reception mode, however, the SECAM signal's chrominance information is subject to an amount of delay during its processing (e.g., by such elements as the SECAM-PAL transcoder, and the SECAM "cloche" bandpass filter at the transcoder input) which is significantly greater than the delay suffered by the PAL signal's chrominance signal information during operation in the PAL-reception mode. One solution to this delay difference problem is to provide the receiver's luminance signal path to the decoder's matrix circuits with a compensating delay of a fixed, compromise value (e.g., lying midway between the respective delay magnitudes appropriate to PAL-reception delay compensation and to SECAM-reception delay compensation). However, in an illustrative receiver arrangement involving realization of the transcoder circuits in integrated circuit form, the delay difference is sufficiently large (e.g., approximately 500 nanoseconds) that reliance on a compensating delay of a fixed, compromise value provides unsatisfactory results.

The present invention is directed to an advantageous delay compensation arrangement for the luminance signal in a receiver of the above-described type wherein different amounts of compensating delay are automatically provided in appropriate dependence upon the receiver's operating mode.

In accordance with an illustrative embodiment of the present invention, the luminance channel of a dual-standard receiver includes a switchable luminance signal delay line in cascade with a chrominance component trap circuit. Illustratively, the chrominance component trap circuit comprises a pair of trap circuits tuned to the respective SECAM subcarrier frequencies (4.250 MHz and 4.40625 MHz); the design of the chrominance component trap circuit is such as to impart delay to the luminance signals passed therethrough of a magnitude appropriate to compensate for the chrominance information delay suffered when the receiver is operated in the PAL-reception mode. The switchable luminance signal delay line is controlled by the mode-switching output of the receiver's identification system in such manner that the delay line is interposed in the luminance signal path in cascade with the chrominance component trap circuit only during receiver operation in the SECAM-reception mode. The magnitude of delay provided by the delay line is substantially equal to the difference in the delays suffered by chrominance information during operation in the respective modes, so that, when the delay line is interposed, the total delay provided by the delay line and trap system in cascade is of a magnitude appropriate to compensate for the chrominance information delay suffered when the receiver is operating in the SECAM-reception mode.

In the accompanying drawing, the sole FIGURE illustrates, partially schematically and partially by block representation, a portion of a dual-standard PAL/SECAM color television receiver incorporating luminance delay control apparatus in accordance with an embodiment of the present invention.

As illustrated in the drawing, composite video signals received by a dual-standard PAL/SECAM color TV receiver appear at an input terminal V, and are applied to the inputs of a cloche filter 11, and a PAL chroma bandpass filter 21. Bandpass filter 21 has a passband encompassing the chrominance signal band associated with a PAL transmission. Filter 11 has a passband encompassing the chrominance signal band of a SECAM transmission, and is provided with a bandpass characteristic of a "cloche" or bell-shaped form, appropriately complementary to the characteristic employed for high frequency pre-emphasis of subcarrier side-bands in SECAM signal formation.

The output of filter 11 is supplied to a SECAM-PAL transcoder 13. The transcoder 13 is illustratively of the general type described in U.K. Pat. No. 1,358,551, wherein the respective SECAM subcarriers are demodulated sequentially by a frequency discriminator, and the resultant color difference signals amplitude modulate in appropriate sequence respective phases of a subcarrier of PAL subcarrier frequency. The subcarrier wave input for transcoder 13 is derived from the reference oscillator of the receiver's PAL decoder 19.

For proper sequencing of operations in transcoder 13, an identification system 15, illustratively of the type described in the aforementioned U.S. patent application Ser. No. 020,942 is coupled to transcoder 13. In the transcoder 13, a flip-flop develops half line rate control waves for use in switching the center frequency tuning of the frequency discriminator employed for demodulating received SECAM signals. When the phasing of the flip-flop output is correct, the discriminator is provided with center frequency tuning appropriate for demodulation of the R-Y SECAM subcarrier (4.40625 MHz) during the image portion of a R-Y line interval of the SECAM signal, and tuning appropriate for demodulation of the B-Y modulated subcarrier (4.250 MHz) during the image portion of a B-Y line interval of the SECAM signal. Through the supplemental association of line rate, burst interval control waves, however, the timing of the changes in discriminator center frequency tuning is so controlled that during the lead-in bursts preceding the image portions of both R-Y and B-Y line intervals, the discriminator center frequency tuning is the same (e.g., tuned for a center frequency corresponding to the R-Y subcarrier). As a consequence of holding the same (R-Y subcarrier) center frequency tuning for all burst intervals, there appears in the filtered output of the discriminator pulses during alternate burst intervals which identify the successive occurrences of a particular (B-Y) line interval.

In the identification system 15, the filtered output of the transcoder's discriminator is applied to a pair of sample-and-hold circuits. Using respective half line rate control waves of mutually opposite phase derived from the flip-flop, and common line rate, burst interval gating pulses, for control of the sampling times of the respective sample-and-hold circuits, one sample-and-hold circuit effects sampling of the filtered discriminator output during the lead-in burst occurrence of alternate line intervals, while the other sample-and-hold circuit effects a sampling of the filtered discriminator output during the lead-in burst occurrence of the intervening line intervals. Comparison of the outputs of the two sample-and-hold circuits in a voltage comparator yields an output indicative of the correctness or incorrectness of the phasing flip-flop circuit. When the output is indicative of incorrect flip-flop phasing, the flip-flop is shut down and then allowed to restart, whereupon a new comparison is effected, with such a process repeated until correct flip-flop phasing is achieved.

The identification system 15 also develops, via such voltage comparison, a switching control signal for effecting automatic control the receiver's operating mode, in dependence upon the SECAM or PAL nature of the received signals. This switching control signal output of identification system 15 is applied to a control terminal SW of electronic switching apparatus 17.

Electronic switching apparatus 17 includes a pair of signal input terminals A and B, and a signal output terminal C. The signal output of transcoder 13 is applied to signal input terminal A of the switching apparatus 17, while the output of the PAL chroma bandpass filter 21 is applied to signal input terminal B. The signal output terminal C of switching apparatus 17 is coupled to the input of PAL decoder 19.

Switching apparatus 17 is illustrated in the drawing in the switching state assumed when the switching control signal establishes a SECAM-reception mode of operation. In this mode of operation, the PAL decoder 19 receives the quasi-PAL signal output of transcoder 13, while being isolated from the output of bandpass filter 21.

The PAL decoder 19 operates upon the quasi-PAL signal, delivered to it by switching apparatus 17 under the illustrated conditions, in the manner described in the aforementioned U.K. Pat. No. 1,358,551, to develop a set of color difference signals R-Y, B-Y and G-Y, which are supplied to matrix 20 for combination with a Y signal from output terminal L of the receiver's luminance channel. The output of the matrix 20 comprises a set of color signals R, B and G which may be supplied to a conventional color kinescope for development of color images representative of the picture information contained in the received SECAM signals.

When the switching control signal applied to terminal SW is appropriate for establishment of a PAL-reception mode of operation for the receiver, the switching state of apparatus 17 is reversed from that illustrated in the drawing. Under such conditions, signals from terminal B are passed to output terminal C, so that the chrominance component of received signals of a PAL nature passed by filter 21 is supplied to PAL decoder 19. Normal PAL decoding operations therein supply color difference information to matrix 20 for development of color signal outputs, which result in reproduction of color images representative of the picture information contained in the received PAL signal.

For proper development of color signals in the outputs of matrix 20, the luminance information supplied to the matrix from terminal L should suffer delay in traversal of the receiver's luminance channel of a magnitude substantially matching the delay incurred in the processing of the chrominance component of the received signals. However, when the receiver operates in the SECAM-reception mode, the chrominance component of a SECAM signal is subject to an amount of delay during its processing (e.g., by such elements as cloche filter 11 and transcoder 13) which is significantly greater than the delay suffered by the chrominance component of a PAL signal during receiver operation in the PAL-reception mode. In accordance with the principles of the present invention, the receiver's luminance channel (now to be described) includes a delay compensation arrangement for the luminance signal wherein different amounts of compensating delay are automatically provided in appropriate dependence upon the receiver's operating mode.

The received composite video signals appearing at terminal V are applied via a coupling capacitor 31 to a pair of paralleled signal paths. In one of these signal paths, signals pass via a resistor 32 in series with a delay line 33 to the base of an NPN transistor 40 disposed as an emitter-follower, with its emitter electrode directly connected to the input terminal I of a chrominance component trap circuit (to be subsequently described). In the other of these signal paths, signals pass via a resistor 51 (shunted by a capacitor 52, for high frequency compensation purposes) to the base of an NPN transistor 50 disposed as an emitter-follower, with its emitter electrode also directly connected to terminal I.

The chrominance component trap circuit includes a pair of parallel resonant circuits (60, 80) in cascade, with a buffering emitter-follower (formed by NPN transistor 70) interposed therebetween. Resonant circuit 60 includes a variable inductor 61 connected between terminal I and the base electrode of transistor 70, and the series combination of capacitors 62 and 63 in shunt with inductor 61. Resonant circuit 80 includes a variable inductor 81 connected between the emitter electrode of transistor 70 and the output terminal O of the chrominance component trap circuit, and the series combination of capacitors 82 and 83 in shunt with inductor 81. Signals passed to terminal O are applied to luminance signal processing circuits 90 for conventional processing to develop the luminance signal input to matrix 20 at terminal L.

The collectors of emitter-follower transistors 40, 50 and 70 are directly connected to the positive terminal of a 12 volt power supply. A DC return to the negative terminal (ground) of the supply for the emitters of transistors 40 and 50 is provided by a resistor 65 connected between the base of transistor 70 and ground. A DC return for the emitter of transistor 70 is provided by a resistor 85 connected between output terminal O and ground. A resistor 64 is coupled between the junction of capacitors 62, 63 and ground, and a resistor 84 is coupled between the junction of capacitors 82, 83 and ground.

The parameters of the chrominance component trap circuit are chosen so that signals passed thereby from terminal I to terminal O undergo a delay of a magnitude providing the luminance signal input to matrix 20 with a delay compensatory for the delay incurred in processing of the chrominance component of a PAL signal when the receiver operates in a PAL-reception mode.

Bias for the base electrode of transistor 40 is provided by a voltage divider formed by resistor 41 connected between the positive supply terminal and the base electrode of transistor 40, and resistor 42 connected between the base electrode of transistor 40 and ground. Bias for the base electrode of transistor 50 is rendered responsive to the operating mode of the receiver by its derivation from the mode-switching output of identification system 15 which is supplied to control terminal SW of switching apparatus 17. A pair of resistors 54 and 56 are connected in series between terminal SW and the base electrode of transistor 50, and a filter capacitor 55 is coupled between the junction of capacitors 54, 56 and ground.

When a PAL-reception mode is to be established, the mode-switching output supplied to terminal SW goes high (e.g., to +12 volts) relative to the bias potential developed by divider 41, 42, rendering transistor 50 conducting and elevating the potential at terminal I to a level effecting cutoff of transistor 40. Under these circumstances, the signal path inclusive of delay line 33 is effectively disabled, and signals pass without significant delay from terminal V to terminal I via a signal path (network 52, 53 and base-emitter path of transistor 50) which bypasses delay line 33.

When a SECAM-reception mode is to be established, the mode-switching output supplied to terminal SW goes low (e.g., to 0 volts) relative to the bias potential developed by divider 41, 42, resulting in cutoff of transistor 50 and conduction by transistor 40. Under these circumstances, the delay line bypassing signal path is effectively disabled, and signals pass from terminal V to terminal I via a signal path inclusive of delay line 33 (and also including resistor 32 and the base-emitter path of transistor 40). The delay imparted by delay line 33 to signals passed thereby is chosen to substantially match the difference between (1) the delay incurred in processing the chrominance component of a PAL signal during operation in a PAL-reception mode, and (2) the delay incurred in processing the chrominance component of a SECAM signal during operation in a SECAM-reception mode. Thus, during operation in a SECAM-reception mode, signals traversing the delay line inclusive signal path and the chrominance component trap circuit in cascade undergo a total delay of a magnitude providing the luminance signal input to matrix 20 with a delay compensatory for the delay incurred in processing of the chrominance component of a SECAM signal.

Illustratively, the variable inductors 61 and 81 are adjusted to tune the resonant circuits 60, 80 of the chrominance component trap circuit to respectively different ones of the two resting frequencies (4.250 MHz and 4.40625 MHz) of the color subcarrier in the SECAM format, to effectively preclude appearance in the color image display of a dot pattern of disturbing level in response to the presence of SECAM subcarriers during SECAM signal reception. With such tuning, the chrominance component trap circuit will also effect, during PAL signal reception, significant attenuation of the PAL subcarrier which lies at a frequency (4.43361875 MHz) slightly higher than the upper SECAM resting frequency.

What is claimed is:

1. In a color television receiver subject to reception of composite color television signals inclusive of a luminance component and of a chrominance component encoded in SECAM format, and to reception of composite color television signals inclusive of a luminance component and of a chrominance component encoded in PAL format; said receiver including: PAL decoder apparatus; a first bandpass filter having a passband encompassing the frequency band occupied by said chrominance component encoded in SECAM format; means responsive to received signals passed by said first bandpass filter for transcoding a chrominance component of SECAM format to a chrominance component of a quasi-PAL format; a path for received signals by-passing said transcoding means and including a second band-pass filter having a passband encompassing the frequency band occupied by said chrominance component encoded in PAL format; and a switching system which (a) couples the output of said transcoding means to the input of said PAL decoder apparatus and decouples the output of said bypassing path therefrom, when in a first switching state, and (b) couples the output of said bypassing path to the input of said PAL decoder apparatus and decouples the output of said transcoding means therefrom, when in a second switching state; apparatus comprising:

a chrominance component trap circuit;

a delay line;

a first signal path for said received signals inclusive of said delay line;

a second signal path for said received signals bypassing said delay line;

means, responsive to the switching state of said switching system, for (a) enabling said delay line inclusive signal path while disabling said delay line bypassing signal path, when said switching system is in said first switching state, and (b) enabling said delay line bypassing signal path while disabling said delay line inclusive signal path, when said switching system is in said second switching state; and means, responsive to the products of chrominance component decoding by said PAL decoder apparatus and to the luminance component of received signals traversing both the enabled one of said signal paths and said chrominance component trap circuit, for forming a plurality of color signals;

wherein said delay line imparts to signals passed thereby a delay substantially equal to the difference between (1) the delay incurred in processing of the chrominance component of said received signals when said switching system is in said first switching state, and (2) the delay incurred in processing of the chrominance component of said received signals when said switching system is in said second switching state; and wherein the delay imparted by said chrominance component trap circuit to signals passed thereby is of such a magnitude that the luminance component to which said color signal forming means responds when said switching system is in said second switching state suffers a delay which substantially matches the delay incurred in processing of the chrominance component of said received signals when said switching system is in said second switching state.

2. Apparatus in accordance with claim 1
wherein said first signal path includes a first transistor having base, emitter and collector electrodes, and means for supplying first bias potential to said base electrode; said first transistor being disposed as an emitter-follower, with its base electrode coupled to the output of said delay line for receiving signals delayed thereby and with its emitter electrode coupled to the input of said chrominance component trap circuit;

wherein said second signal path includes a second transistor having base, emitter and collector electrodes, said second transistor being disposed as an emitter-follower, with its base electrode coupled to the input of said delay line for receiving relatively undelayed signals and with its emitter electrode directly connected to the emitter electrode of said first transistor; and wherein said switching state responsive means comprises means for supplying to the base electrode of said second transistor (1) when said switching system is in said first switching state, a second bias potential which differs from said first bias potential in such a sense as to cause a cutoff of said second transistor and conduction by said first transistor, and (2) when said switching system is in said second switching state, a third bias potential which differs from said first bias potential in such a sense as to cause conduction by said second transistor and cutoff of said first transistor.

3. Apparatus in accordance with claim 1 wherein said SECAM format involves frequency modulation of sub-carrier waves of a first resting frequency during alternate line intervals, and frequency modulation of subcarrier waves of a second resting frequency during the intervening line intervals, and wherein said chrominance component trap circuit includes a first resonant circuit tuned to said first resting frequency of said SECAM format, and a second resonant circuit tuned to said second resting frequency of said SECAM format.

4. Apparatus in accordance with claim 2 wherein said switching system includes means responsive to said received signals for determining the switching state of said switching system, said last-named means being coupled to said bias potential supplying means for determining the magnitude of bias potential supplied thereby to the base electrode of said second transistor.

* * * * *